2 Sheets—Sheet 1.

A. F. RANSOM.

HORSE BLANKET.

No. 11,427. Reissued July 3, 1894.

Witnesses:
E. C. Lemme
Chas. L. Goss.

Inventor:
Albert F. Ransom
By Wingler, Flanders, Smith & Bottum, Vaile
Attorneys.

A. F. RANSOM.

HORSE BLANKET.

2 Sheets—Sheet 2.

No. 11,427.

Reissued July 3, 1894.

Witnesses:

E. B. Lemuel

Chas. L. Goss,

Inventor:

Albert F. Ransom

By Wright Brown & Quinby

Attorneys.

UNITED STATES PATENT OFFICE.

ALBERT F. RANSOM, OF BURLINGTON, WISCONSIN, ASSIGNOR TO THE BURLINGTON BLANKET COMPANY.

HORSE-BLANKET.

SPECIFICATION forming part of Reissued Letters Patent No. 11,427, dated July 3, 1894.

Original No. 447,793, dated March 10, 1891. Application for reissue filed August 3, 1891. Serial No. 401,604.

*To all whom it may concern:*

Be it known that I, ALBERT F. RANSOM, a citizen of the United States, residing at Burlington, in the county of Racine and State of Wisconsin, have invented certain new and useful Improvements in Horse Blankets or Covers; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to horse blankets or covers of that class worn by horses when in the stables; and it has for its object to provide a blanket or cover which may be readily washed without injury, which may be cheaply produced and still be strong and reliable, which will be so constructed that it will securely remain in place and will prevent wear at the upper portion of the tail and lower part of the mane of the horse.

Figure 1:
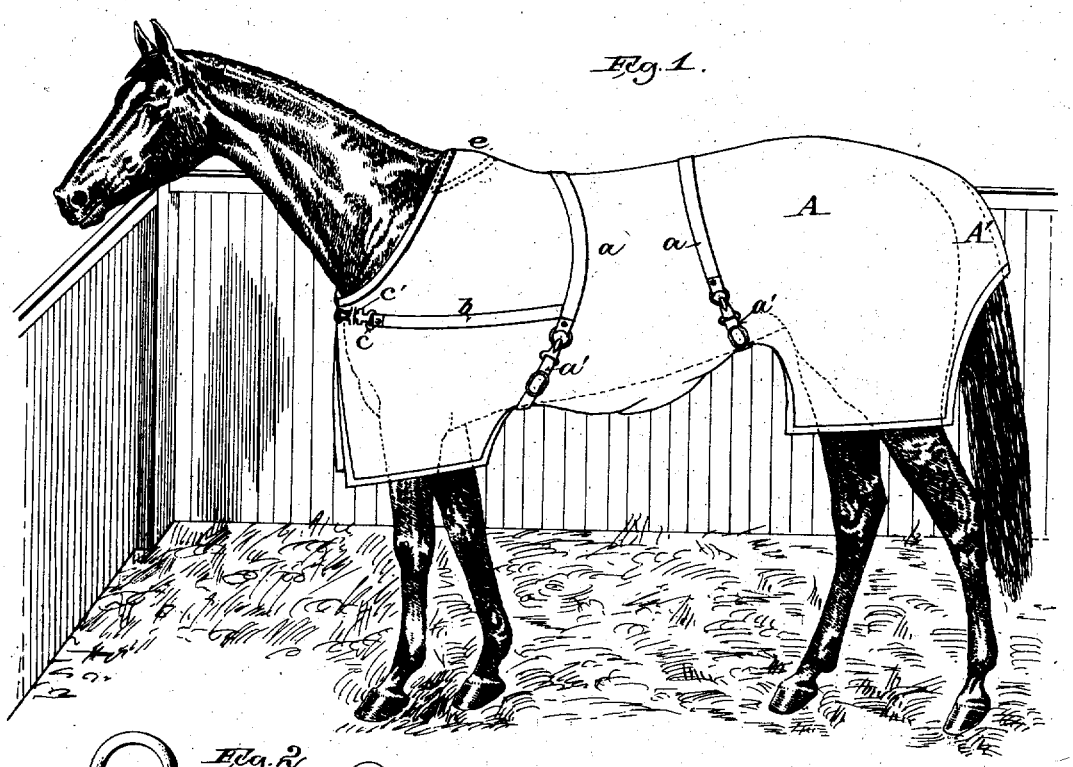
Figure 2:
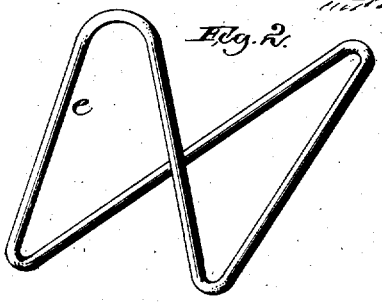
Figure 3:
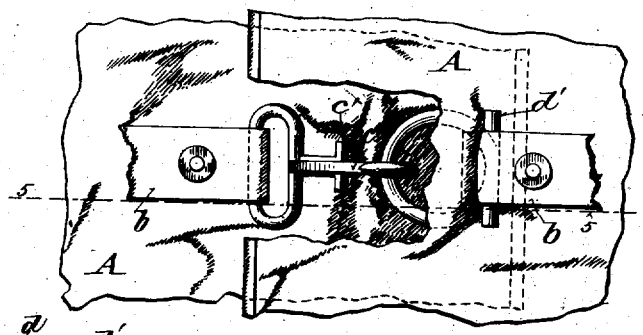
Figure 5:
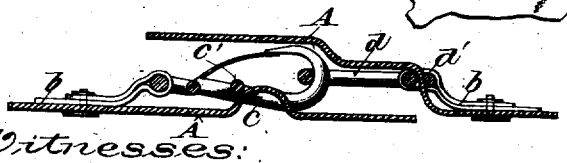
Figure 4:
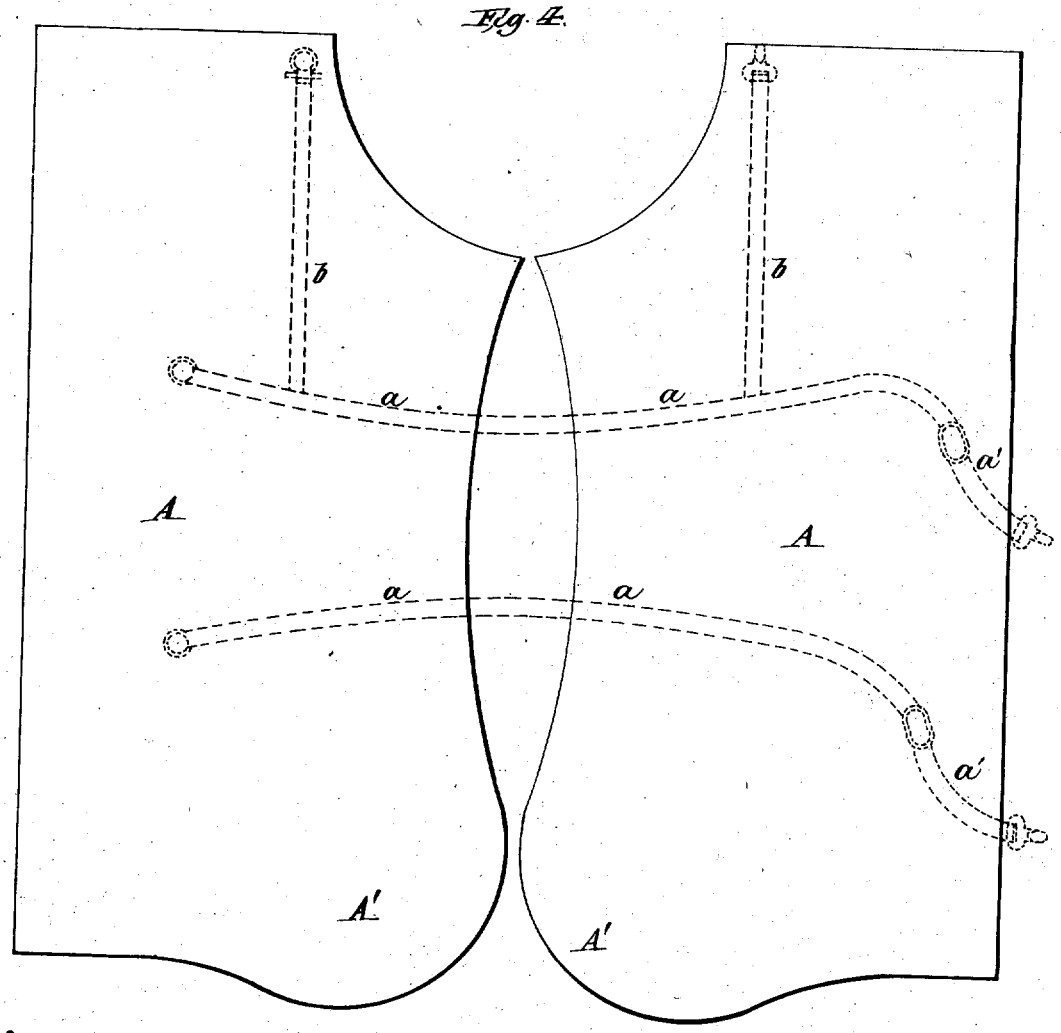

In the accompanying drawings, Figure 1 represents a horse wearing my improved cover. Fig. 2 is a detail perspective view of the stiffening-frame at the upper neck portion of the cover. Fig. 3 is a detail view of the fastenings for the breast stays. Fig. 4 is a diagram illustrating the pattern of the cover, the fastenings and stays being indicated by dotted lines. Fig. 5 is a section on line 5 5, Fig. 3.

The body of the cover A will, for cheapness, preferably be of canvas, duck, or some stout hemp cloth, but may if desired, be of the coarse woolen fabric in common use for horse-blankets.

To the body of the cover are attached, by sewing or otherwise, transverse or diagonal bands or stays *a*, which are of fabric, (instead of leather, as are the stays heretofore more commonly in use,) and which are to be joined underneath the horse by connections *a'*, also preferably of fabric, these stays *a* and *a'* being connected when the cover is applied to the horse by snap-hooks and rings, as more clearly shown in Fig. 1. Running from the forward stay *a* are the breast-stays *b*, also of fabric, these breast-stays being connected by a snap-hook *c* and a ring *d*. As there will be at times considerable strain on these breast-stays, I divide the strain thereon with the blanket by providing the said snap-hook *c* with a cross bar *c'*, which will bear against a portion of the fabric through a small bight or fold in which the said hook passes, as shown in Fig. 3, and the ring *d* is also provided with a cross bar *d'*, which bears against the cover or blanket, through which latter the ring is passed in position to be engaged with the said snap-hook. These cross-bars *c'* and *d'* bear against the blanket and pull on the same independently of the breast-stays, and thus divide the strain between the cover fabric and the said stays.

To stiffen the blanket or cover at the upper side of the horse's neck and keep the cover in place, I prefer to provide the same with a stiffening-frame *e*. (Shown in detail in Fig. 2 and indicated by dotted lines in Fig. 1.) This stiffening frame is preferably formed of some soft flexible wire—such, for example, as the covered wire in common use for electrical conductors—and as it is stitched inside of the blanket or cover it serves to stiffen the same at the point where it is applied and holds it in place, so that said cover or blanket will not saw back and forth over the neck of the horse, and thus wear upon the mane, while at the same time, being but semi-rigid, it is sufficiently flexible to fold up with the blanket when the latter is folded.

To prevent the horse, when in the stall, from wearing the hair off the upper portion of his tail, and also to assist in keeping the blanket in place, said blanket is so cut as to form an imperforate or non-open hood or cover A', coming down far enough on the rump of the horse to protect that portion of his tail which is exposed to wear by rubbing against the sides of the stall in which he may be placed.

Below the hood portion A' the cover is open, as shown in Fig. 1, to permit the animal to have the free use of his tail.

As will appear from Fig. 1 of the drawings, the hood A' extends over the upper portion of the tail for some distance below the root of the tail and down the haunches, the sides of the hood constituting a continuation of the sides of the blanket passing back of the haunches and over the tail at the vertebral portion thereof, the portion of the blanket below the lower edge of said hood being separated or opened to allow the free use of the tail below the vertebral portion. This construction while covering the upper portion or vertebral part of the tail so as to protect that portion as previously stated also imparts to the back part of the blanket such form that it fits to the rump in a manner that secures the blanket staying in position on the rump and at the same time allows a natural movement of the tail under the hood, while the open or separated portion below the lower edge of the hood allows the free use of the tail below the vertebral portion. It is to be observed that care is to be taken that the hood shall extend some distance below the root of the tail and across the vertebral portion of the tail from the sides of the blanket otherwise the object of this invention will not be attained.

By providing the blanket or cover with bands or stays of fabric, instead of the leather bands or stays heretofore more commonly used, it will be apparent that the cover or blanket is adapted to be washed, when required without any possible injury to any part thereof, this being a great desideratum for cleanliness and neatness of appearance.

Having thus described my invention, I claim and desire to secure by Letters Patent—

1. The combination, with a horse blanket or cover provided with the bands or stays *a* of fabric, of the fabric breast-stays *b*, one having a snap-hook and the other a ring to be engaged by said hook, said ring and hook being each provided with a cross-bar to engage the said blanket or cover, and thus divide the strain between the latter and the said stays.

2. A horse blanket or cover provided at the upper side of its neck portion with a semi-rigid pliable stiffening-frame *e*, stitched inside of the cover fabric and arranged to straddle the withers and hold the blanket or cover in place and prevent it from sawing back and forth and thus wearing the mane.

3. A horse blanket or cover provided in front with breast-stays and with one or more transverse bands permanently attached to the blanket and having suitable fastenings by which the edges are brought together and secured at the breast and under the belly of the animal and the front portion of the blanket is held in place, the rear end of the blanket being formed into a hood approximately fitting the rump and extending over the upper portion of the tail for some distance below the root of the tail and down the haunches, the sides of the hood constituting a continuation of the sides of the blanket passing back of the haunches and over the tail across the vertebral portion thereof, the portion of the blanket below the lower edge of said hood being separated so as to open, substantially as and for the purposes described.

4. A blanket or cover having a hood at its rear portion approximately fitting the rump and extending over the upper portion of the tail for some distance below the root of the tail and down the haunches and whose sides constitute a continuation of the sides of the blanket passing back of the haunches and over the tail across the vertebral portion thereof, the portion of the blanket below the lower edge of said hood being separated so as to open, whereby the blanket is held to the rump, the upper vertebral portion of the tail is covered, and the part of the tail below the vertebral portion is free to move in the open or separated portion of the blanket below the hood, substantially as and for the purposes described.

In testimony whereof I affix my signature in presence of two witnesses.

ALBERT F. RANSOM.

Witnesses:
W. A. COLBY,
W. E. LACEY.